United States Patent
Oshikawa et al.

(10) Patent No.: US 9,643,778 B2
(45) Date of Patent: May 9, 2017

(54) AUTOMATED WAREHOUSE

(71) Applicant: MURATA MACHINERY, LTD., Kyoto-shi, Kyoto (JP)

(72) Inventors: Takayuki Oshikawa, Inuyama (JP); Fumitake Uemura, Inuyama (JP); Daisuke Sebara, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 14/990,273

(22) Filed: Jan. 7, 2016

(65) Prior Publication Data

US 2016/0244260 A1 Aug. 25, 2016

(30) Foreign Application Priority Data

Feb. 25, 2015 (JP) ................................. 2015-035640

(51) Int. Cl.
  *B65G 1/137* (2006.01)
  *B65G 1/04* (2006.01)

(52) U.S. Cl.
  CPC ......... *B65G 1/0407* (2013.01); *B65G 1/0414* (2013.01); *B65G 1/137* (2013.01)

(58) Field of Classification Search
  CPC ..... B65G 1/0414; B65G 1/137; B65G 1/0407
  See application file for complete search history.

(56) References Cited

U.S. PATENT DOCUMENTS

| | | | | |
|---|---|---|---|---|
| 3,800,963 A * | 4/1974 | Holland | ................. | B65G 1/065 191/12.2 R |
| 4,964,776 A | 10/1990 | Wakita et al. | | |
| 7,261,509 B2 * | 8/2007 | Freudelsperger | .... | B65G 1/1378 414/269 |
| 8,260,454 B2 * | 9/2012 | Checketts | .............. | G06Q 10/06 414/234 |
| 8,876,454 B2 * | 11/2014 | Koholka | .............. | B65G 1/1378 414/277 |
| 2004/0228710 A1 * | 11/2004 | Ueda | .................... | B65G 1/0421 414/279 |
| 2006/0051190 A1 * | 3/2006 | Taguchi | ............... | B65G 1/0421 414/279 |
| 2006/0285948 A1 * | 12/2006 | Tsujimoto | ................ | B65G 1/06 414/279 |
| 2007/0065258 A1 * | 3/2007 | Benedict | ................. | B63B 25/22 414/266 |
| 2011/0008137 A1 * | 1/2011 | Yamashita | ........... | B65G 1/0492 414/267 |

(Continued)

FOREIGN PATENT DOCUMENTS

JP 2012-071932 A 4/2012

*Primary Examiner* — Michael McCullough
*Assistant Examiner* — Ashley Romano
(74) *Attorney, Agent, or Firm* — Keating & Bennett, LLP

(57) ABSTRACT

An automatic warehouse includes a storage shelf and a carriage device that carries a package. The carriage device includes a horizontal guide member located inside of the storage shelf and extending in a lateral direction, a prop inside of the storage shelf and supporting the horizontal guide member, a cart that travels along the horizontal guide member, a vertical guide member connected to the cart at an intermediate position, and a lift stage guided by the vertical guide member. The automatic warehouse further includes a transfer device attached to the lift stage.

6 Claims, 6 Drawing Sheets

(56) References Cited

U.S. PATENT DOCUMENTS

| | | | | |
|---|---|---|---|---|
| 2011/0262253 A1* | 10/2011 | Krizmanic | .......... | B60L 11/1811 414/279 |
| 2012/0177465 A1* | 7/2012 | Koholka | ............. | B65G 1/0492 414/279 |
| 2013/0149080 A1* | 6/2013 | Martin De Pablo | ..... | B65G 1/06 414/281 |

* cited by examiner

AUTOMATED WAREHOUSE

BACKGROUND OF THE INVENTION

1. Field of the Invention

The present invention relates to an automatic warehouse capable of automatically carrying a package in and out of a storage shelf, to store the package.

2. Description of the Related Art

A known automatic warehouse includes storage shelves, a carriage device and a transfer device, the carriage device being called a stacker crane or the like and being capable of carrying a package along the storage shelves, the transfer device being provided in the carriage device and capable of transferring the package between the carriage device and the storage shelf.

In such an automatic warehouse, for example, as described in Unexamined Japanese Patent Publication No. 2012-71932 ., the storage shelves are provided on both sides of the carriage device. Further, the carriage device is provided with a cart that travels on a floor between the two storage shelves, a mast that extends upward from the cart along the storage shelves, and a lift stage that is lifted or lowered along the mast. Moreover, the transfer device is attached to the lift stage, and can transfer the package between the carriage device and the storage shelf on either side.

According to the above automatic warehouse, it is possible to automatically take the package out of the storage shelf to carry it out of the warehouse, and automatically store the package carried in the warehouse into the storage shelf.

Nowadays, the automatic warehouses have been diversified, and for example, an automatic warehouse for a small package has appeared. In the case of such an automatic warehouse, an area for passage of the carriage device such as a space between the storage shelves or between the storage shelf and a wall is narrow and small. When maintenance is to be done on the carriage device or the like, at the time of a worker passing through an operation area of the carriage device, there occurs a problem of the cart on his or her feet getting in the way, a problem of the vertically extending mast getting in the way, and other problems.

SUMMARY OF THE INVENTION

Preferred embodiments of the present invention provide an automatic warehouse capable of handling a small package, and ensuring favorable maintainability, and the like.

An automatic warehouse according to a preferred embodiment of the present invention is an automatic warehouse including a storage shelf that includes storage portions storing a package and arrayed in a vertical direction and a lateral direction; and a carriage device that carries the package along the storage shelf. The carriage device includes a horizontal guide member that is arranged on an inside of the storage shelf, with the storage portions existing thereabove and therebelow, and extends in the lateral direction along the storage shelf, a prop that extends in the vertical direction along the storage shelf, with the storage portions existing on the sides thereof in the lateral direction along the storage shelf, and supports the horizontal guide member, a cart that travels along the horizontal guide member, a vertical guide member that extends in the vertical direction along the storage shelf and is connected to the cart at an intermediate position, and a lift stage that is guided by the vertical guide member to move in the vertical direction.

The automatic warehouse further includes a transfer device that is attached to the lift stage and transfers the package between the storage shelf and the lift stage.

Accordingly, the vertical guide member is able to be arranged in the vicinity of the storage shelf. Hence it is possible to ensure a space between the storage shelves or between the storage shelf and a wall, and to facilitate maintenance of the automatic warehouse. Further, since the horizontal guide member is arranged in the intermediate portion of the vertical guide member, a distance from the portion in which the vertical guide member is held to the end is shorter than it would be when the vertical guide member is held at the end. Thus, even when the lift stage exists at the end of the vertical guide member by being lifted or lowered, a load (a moment) applied to the vertical guide member is able to be reduced. Hence it is possible to reduce the size of the vertical guide member, and also in this respect, it is possible to ensure a wide area for a worker to pass through at the time of maintenance or the like.

Further, the vertical guide member may include a mast extending in the vertical direction. The cart includes guide members slidably engaged to the horizontal guide member, on both sides of the mast in a travelling direction. The transfer device may include a first transfer device and a second transfer device respectively provided on both sides of the mast in the travelling direction.

Accordingly, the horizontal guide member and the cart are able to be engaged at a position as distant from each other as possible in the travelling direction of the cart. Hence it is possible to allow stable traveling of the vertical guide member held in the cart, in the travelling direction. Moreover, since the transfer device is also arranged with a good balance to the mast in the travelling direction, it is possible to allow stable traveling of the vertical guide member.

Further, the horizontal guide member may include a beam member stretched between the props, a first rail attached to a first surface portion of the beam member, and a second rail attached to a second surface portion of the beam member which is different from the first member. The guide member may be engaged to the first rail and the second rail.

Accordingly, roles (functions of a rail) are able to be allocated such that one rail mainly supports a load of the vertical guide member and the like while the other rail precisely guides the cart. Moreover, it is possible to effectively reduce swinging of the vertical guide member about an axis along the horizontal guide member.

Further, the cart may include a horizontal driving device which moves between the storage portions arranged in the vertical direction and allows traveling of the cart along the horizontal guide member by a motor including a rotary axis body arranged along the horizontal guide member.

Accordingly, the horizontal driving device moves in the space on the inside of the storage shelf, and hence it is possible to reduce a dead space in front of the storage shelf and to ensure a wide passage for a working vehicle.

Further, the automated warehouse may include an opposite storage shelf which is arranged facing the storage shelf and to which the package is transferred by the transfer device, and a power cable that supplies electric power to the carriage device while changing a form thereof below the opposite storage shelf with travelling of the cart.

Accordingly, a power cable changing area, in which the form of the power cable changes with travelling of the cart, is ensured in the dead space below the storage shelf, thus enabling dense storage of the packages in the automatic warehouse as a whole.

The automatic warehouse may include a plurality of carriage devices in the vertical direction.

Accordingly, a plurality of carriage devices are simultaneously operated, to enable achievement of an automatic warehouse with high processing capability.

According to various preferred embodiments of the present invention, it is possible to densely store packages and ensure high maintainability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Next, preferred embodiments of an automatic warehouse according to the present invention will be described with reference to the drawings. It is to be noted that the following preferred embodiments merely illustrate examples of the automatic warehouse according to the present invention. Thus, the scope of the present invention is defined by the wording of the claims with reference to the following preferred embodiments, and is not restricted to the following preferred embodiments. Hence an element or feature not recited in an independent claim showing the most superordinate concept of the present invention out of elements and features of the following preferred embodiments below will be described as a constituent being not necessarily required in one of the preferred embodiments of the present invention, but constituting a more preferable form.

Further, each of the drawings is a schematic drawing obtained by appropriate emphasis, omission and ratio adjustment so as to illustrate various preferred embodiments of the present invention, and a shape, a positional relation or a ratio therein may be different from the actual one.

Figure 1:
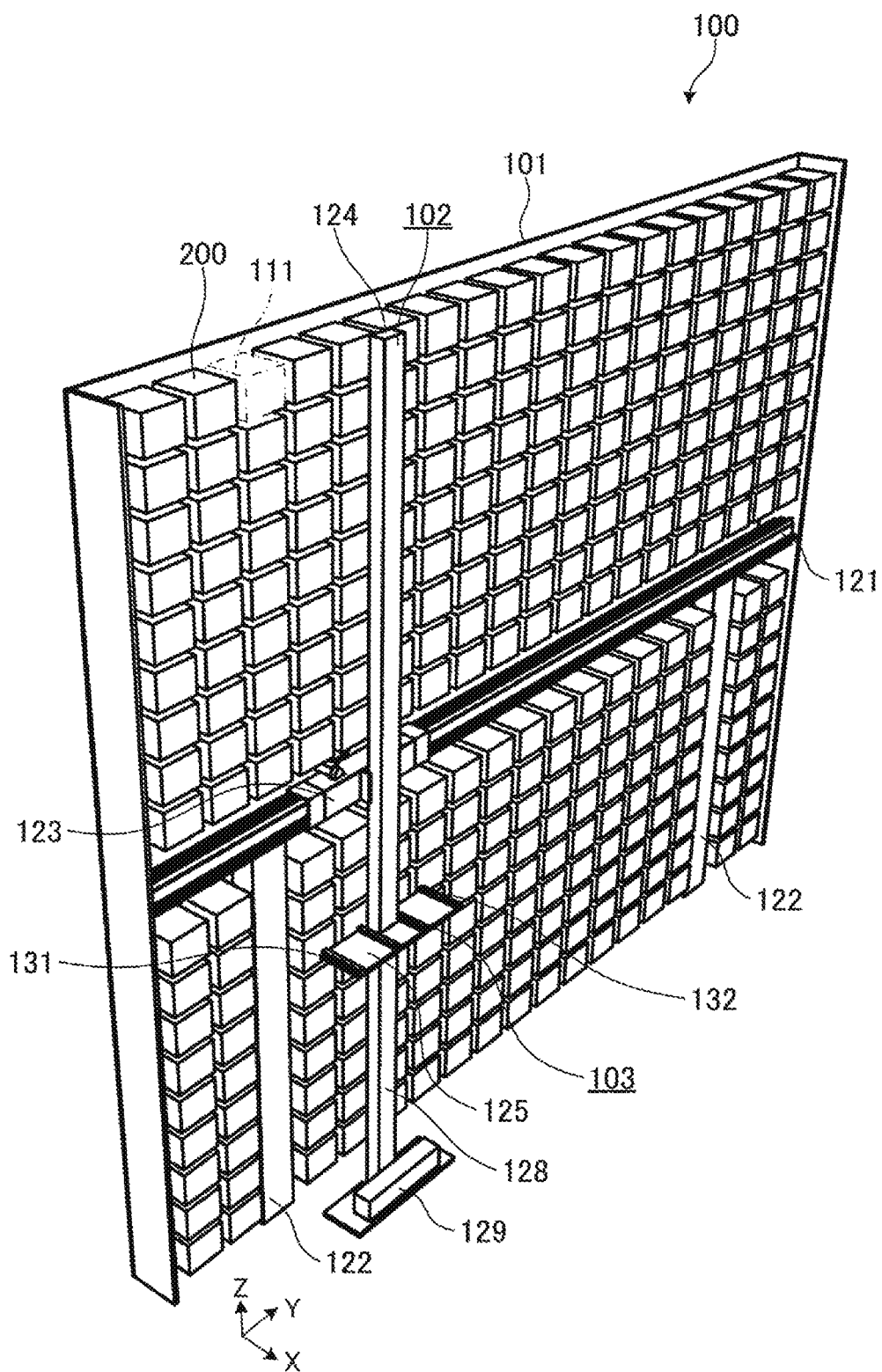
FIG. 1 is a perspective view illustrating an automatic warehouse.

FIG. 1 is a perspective view illustrating an automatic warehouse.

As illustrate in this drawing, an automatic warehouse 100 is a facility capable of automatically storing a package 200 carried in from the outside and automatically taking out the stored package 200 to carry it to the outside. The automatic warehouse 100 is provided with a storage shelf 101, a carriage device 102 and a transfer device 103.

The storage shelf 101 preferably includes storage portions 111, storing the packages 200, arrayed in a vertical direction and a lateral direction in a matrix.

Figure 2:
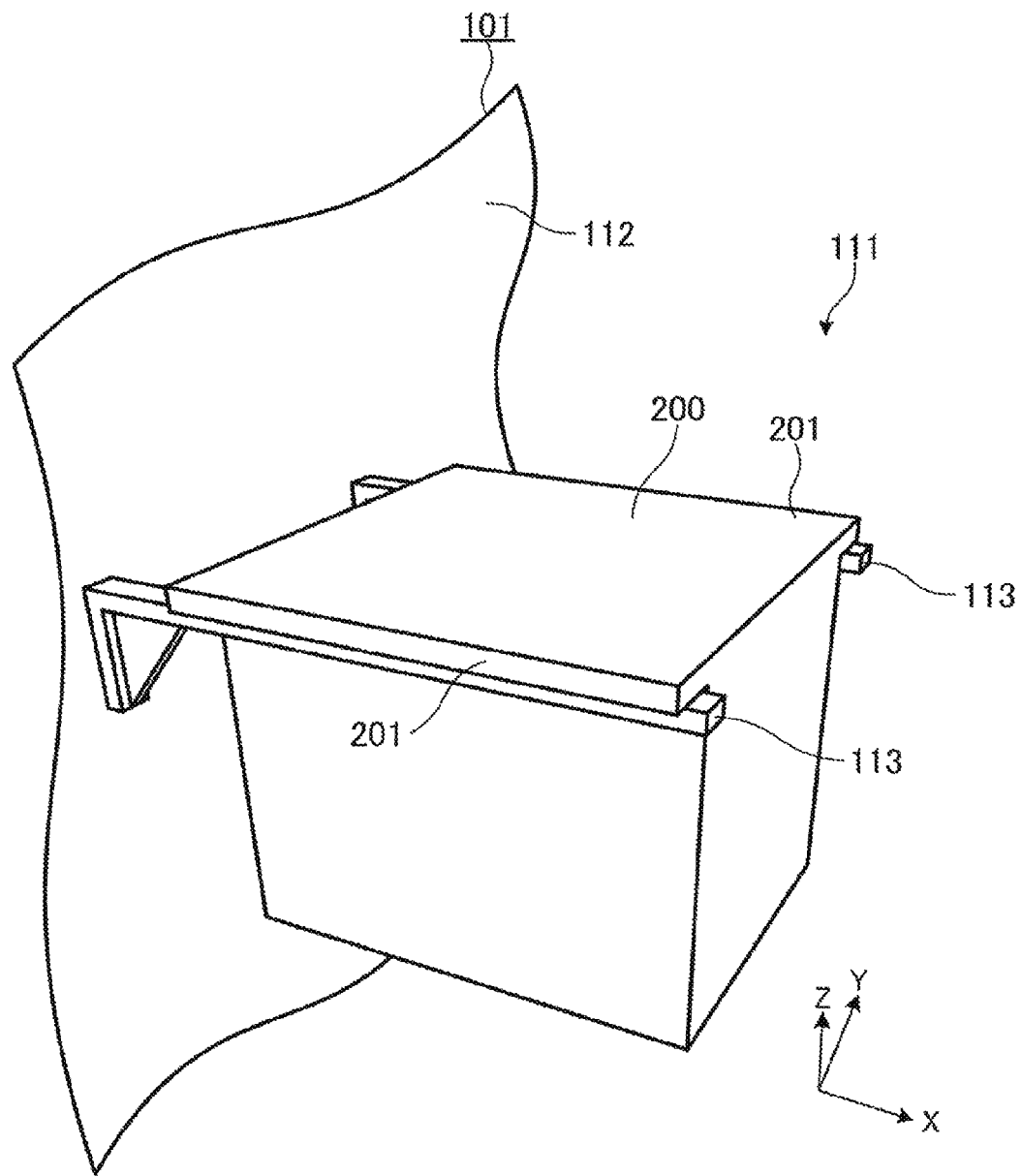
FIG. 2 is a perspective view illustrating a storage portion of a storage shelf.

FIG. 2 is a perspective view illustrating the storage portion of the storage shelf.

As illustrated in this drawing, the storage portion 111 is a portion of the storage shelf 101 which stores the package 200. Herein, the storage portion 111 is an abstract concept showing a portion (area) in which one package 200 is held in the storage shelf 101.

In the case of the present preferred embodiment, the package 200 is provided with flange portions 201 respectively projecting toward the right and left directions along the storage shelf 101. Meanwhile, the storage shelf 101 is provided with a rear surface portion 112 at its rear, and provided with two holding members (cantilevers) 113 for one package 200, the members 113 being attached to the rear surface portion 112 while projecting forward (a +X-axis direction in the drawing) from the rear surface portion 112. As above, the storage portion 111 is an area including the two holding members 113 and the package 200 hanging between the two holding members 113, with the flange portions 201 engaged with the holding members 113.

It is to be noted that, when the storage shelf 101 is provided with a shelf plate extending in the horizontal direction and the package 200 is stored while being placed on the shelf plate, the position of the storage portion 111 may not be fixed in a horizontal direction.

Figure 3:
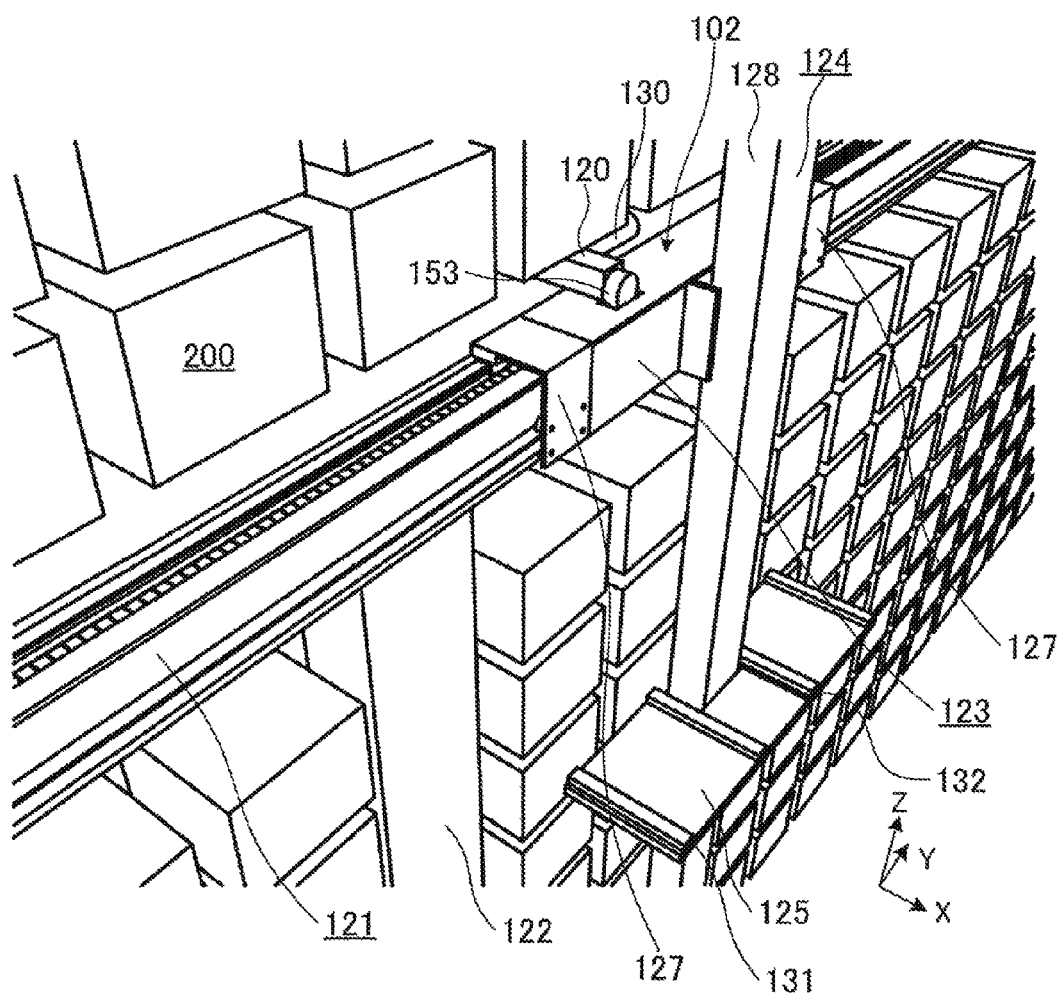
FIG. 3 is a perspective view illustrating an intermediate portion of a carriage device.

FIG. 3 is a perspective view illustrating an intermediate portion of the carriage device.

As illustrated in this drawing, the carriage device 102 is a device that carries the package 200 along the storage shelf 101, and provided with a horizontal guide member 121, a prop 122, a cart 123, a vertical guide member 124 and a lift stage 125.

The horizontal guide member 121 defines a track on which the cart 123 travels and supports loads of the cart 123, the vertical guide member 124, the lift stage 125 and the like. The horizontal guide member 121 is arranged on the horizontal plane on the inside of the storage shelf 101, and the storage portions 111 exist above and below the horizontal guide member 121. Further, the horizontal guide member 121 extends in the lateral direction (a Y-axis direction in the drawing) along the storage shelf 101. That is, in the storage shelf 101, an area corresponding to a plurality of levels (two levels in the present preferred embodiment) of the storage portions 111 which are continuous in the vertical direction is used as an area arranged with the horizontal guide member 121, and the horizontal guide member 121 is in the state of being buried in the above area in the storage shelf 101.

Figure 4:
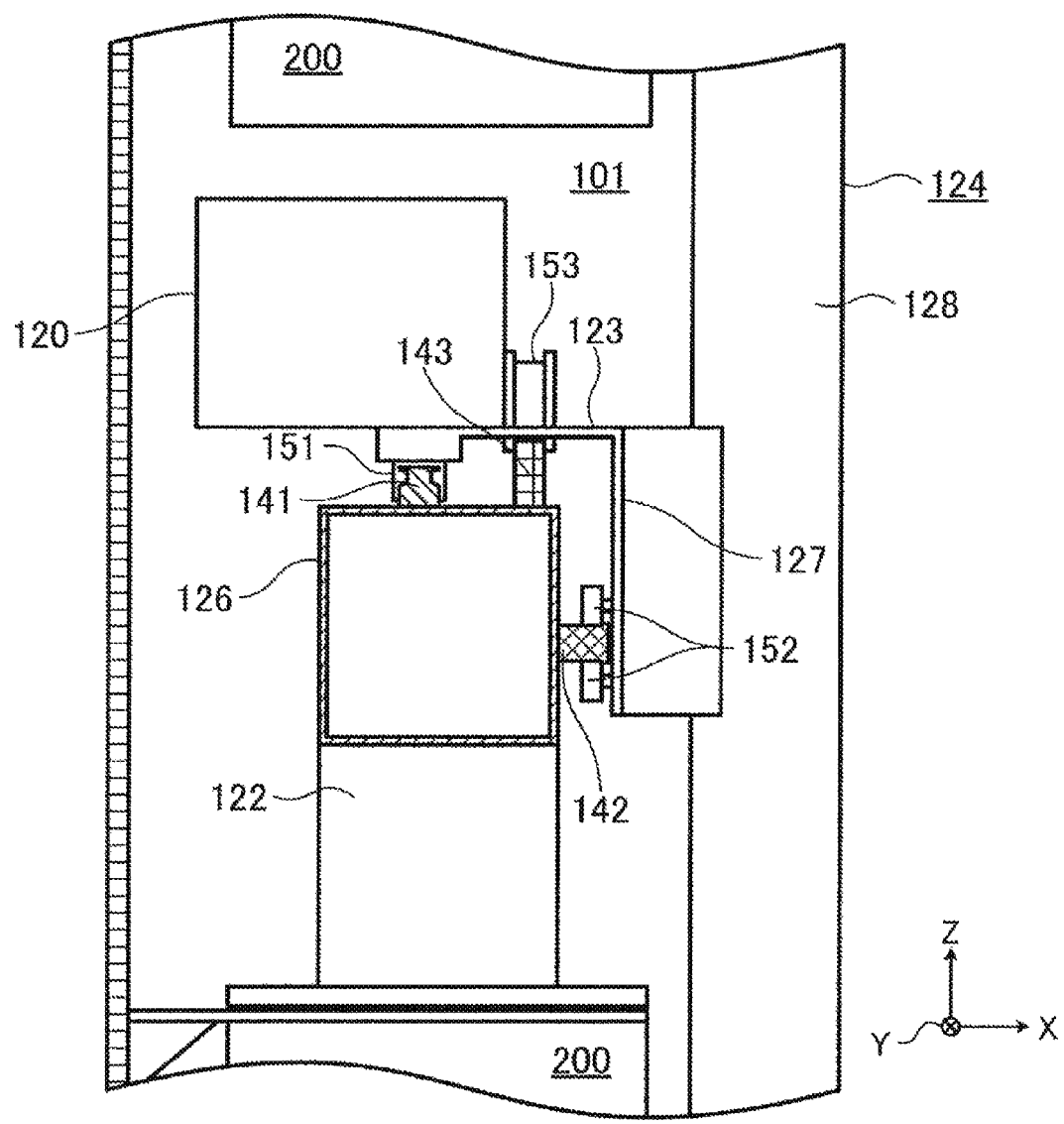
FIG. 4 is a side view illustrating a horizontal guide member and its vicinity in a partial section.

FIG. 4 is a side view illustrating the horizontal guide member and its vicinity in a partial section.

As illustrated in this drawing, in the case of the present preferred embodiment, the horizontal guide member 121 guides the cart 123 in the lateral direction (a Y-axis direction in the drawing) along the storage shelf 101 on the horizontal plane, and in the case of the present preferred embodiment, the horizontal guide member 121 is provided with a beam member 126, a first rail 141 and a second rail 142.

The beam member 126 is a bar-shaped member mainly providing a structural strength of the horizontal guide member 121. A material type and a shape of the beam member 126 are not particularly restrictive, but in the case of the present preferred embodiment, a square pipe is preferably used, for example. The beam member 126 is supported so as to be stretched between a plurality of props 122 vertically provided at an interval, and arranged on the inside of the storage shelf 101 along the lateral direction (the Y-axis direction in the drawing) along the storage shelf 101.

The first rail 141 is a rail attached to a first surface portion (an upper surface portion in the case of the present preferred embodiment) of the beam member 126 which includes an extending-direction axis of the beam member 126. In the case of the present preferred embodiment, the first rail 141 is a rail that smoothly guides travelling of the cart 123, while supporting the loads of the cart 123 and the vertical guide member 124. Examples of the first rail 141 include a linear rail constituting a linear guide.

The second rail 142 is a rail attached to a second surface portion of the beam member 126 (a side surface portion of the carriage device in the case of the present preferred embodiment) which includes an extending-direction axis of the beam member 126 and intersects with the first surface portion. In the case of the present preferred embodiment, the second rail 142 reduces swinging rotationally about a traveling-direction axis of the vertical guide member 124. Examples of the second rail 142 include a plate-shaped rail on which a cam follower defining a bearing with a shaft can be rolled in a contacting state.

As thus described, the rails are respectively provided on the surface portions which include the extending-direction axes of the beam member 126 and intersect with each other, thus enabling performance of respectively different functions.

In the case of the present preferred embodiment, the beam member 126 is further provided with a driving rail 143 to generate a driving force for the cart 123 to travel. The driving rail 143 is, for example, a rack and is able to generate a driving force by being engaged with a pinion provided in the cart 123. It is to be noted that a normal rack and a normal pinion make large operation sound, and backlash exists therebetween. Thus, the pinion may be provided by arranging roller pins at regular intervals on a circumference, and a rack corresponding to this may be used, to use an anti-backlash mechanism. Further, the driving rail 143 may be provided with an electromagnetic coil as in a linear motor.

The prop 122 is a member that is vertically provided on an attachment base 301 (see FIG. 5) and supports the beam member 126, as well as a member extending in the vertical direction along the storage shelf 101, with the storage portions 111 existing on the sides of the prop 122 in the lateral direction along the storage shelf 101. That is, similarly to the horizontal guide member 121, an area continuous in the vertical direction in the storage shelf 101 is not used as the storage portions 111 but used as an area arranged with the prop 122, and the prop 122 is arranged in the area, being buried in the storage shelf 101.

In the case of the present preferred embodiment, two props 122 preferably are provided for one horizontal guide member 121, but the number of props 122 may be larger than two.

Further, except for connection via the attachment base 301, there is no mechanical connection between the prop 122 and the storage shelf 101 and between the horizontal guide member 121 and the storage shelf 101. That is, the carriage device 102 and storage shelf 101 are installed independently of the attachment base 301. This makes vibration of the carriage device 102 unlikely to be transmitted to the storage shelf 101, and enables reduction in occurrence of displacement and the like of the package 200 being stored in the storage shelf 101.

The cart 123 is a device that travels along the horizontal guide member 121 to allow moving of the attached vertical guide member 124 along the horizontal guide member 121. In the case of the present preferred embodiment, the cart 123 is provided with guide members 127 slidably engaged to the horizontal guide member 121, at both ends in the travelling direction (the Y-axis direction in the drawing). Further, the cart 123 is attached with the vertical guide member 124 at a central position between the two guide members 127. This enables reduction in falling of the vertical guide member 124 in the travelling direction.

Further, the guide member 127 is provided with a first guide 151 slidably engaged to the first rail 141, and a second guide 152 slidably engaged to the second rail 142. In the case of the present preferred embodiment, the first guide 151 is a linear guide slidably engaged to the linear rail. The second guide 152 preferably includes two cam followers arranged so as to hold the plate-shaped second rail 142 therebetween in the vertical direction.

Further, the cart 123 is provided with a horizontal driving device 120 that moves between the storage portions 111 arranged in the vertical direction to allow traveling of the cart 123 along the horizontal guide member 121. The horizontal driving device 120 is provided with a driving body 153 that generates a force in the travelling direction by being engaged with the driving rail 143 attached to the beam member 126. In the case of the present preferred embodiment, the driving body 153 is a pinion that is engaged to the rack as the driving rail 143 while rotating, to move in the travelling direction.

It is to be noted that, when the driving rail 143 includes an array of electric magnets constituting the linear motor, the driving body 153 is a magnetic body.

Further, the horizontal driving device 120 is provided with a motor 130 including a rotary axis body (not shown) extending along the travelling direction of the cart 123. By arranging the motor 130 in this manner, even in the storage shelf 101 with a small size, it is possible to allow travelling of the cart 123 while the whole of the horizontal driving device 120 is housed on the inside of the storage shelf 101.

The vertical guide member 124 is an elongated member that guides the lift stage 125 that is lifted or lowered in the vertical direction, as well as a member extending in the vertical direction along the storage shelf 101 and fixed to the cart 123 at an intermediate position in the vertical direction. Further, in a passage area of the lift stage 125, the vertical guide member 124 is arranged closer to the storage shelf 101 than the central position.

In the case of the present preferred embodiment, the vertical guide member 124 preferably is provided with one mast 128 in a hollow square configuration that extends in the vertical direction. The mast 128 is arranged in the vicinity of the storage shelf 101. A transmission member such as a chain or a wire (not shown) which is connected to the lift stage 125 and transmits driving force to lift and lower is inserted into the hollow portion of the mast 128, and a pulley (not shown) to guide this member, and the like, are attached to the mast 128.

Further, a vertical driving device 129 (see FIGS. 1 and 5) that lift and lower the lift stage 125 along the mast 128 is attached to a lower end of the mast 128 as well as a position below the lowermost level of the storage portion 111 in the storage shelf 101 and on the side of the storage shelf 101. The vertical driving device 129 is connected to the transmission member and transmits driving force to the lift stage.

The lift stage 125 is guided by the vertical guide member 124, especially by the mast 128, to move in the vertical direction, and attached with the transfer device 103. In the case of the present preferred embodiment, the lift stage 125 projects from both ends of the mast 128 in the travelling direction of the cart 123. Since the mast 128 is arranged in the vicinity of the storage shelf 101, the lift stage 125 projects relatively longer on one side (the opposite side to the storage shelf 101 in the case of the present preferred embodiment) of the mast 128 in the transferring direction of the package 200 (the X-axis direction in the drawing).

The transfer device 103 is a device that is attached to the lift stage 125 and extends and retracts arms (not shown) into and out of the storage shelf 101 to transfer the package 200 between the storage shelf 101 and the lift stage 125. A transferring method using the transfer device 103 is not particularly restrictive, and examples thereof may include a method of pushing or pulling the package 200 by use of the arms to slide it between the storage shelf 101 and the lift stage 125 so as to transfer the package 200, and a method of lifting the package 200 by use of forks attached to the arms to move it and unloading the package 200 to place it so as to transfer the package 200.

In the case of the present preferred embodiment, the transfer device 103 is preferably provided with a first transfer device 131 and a second transfer device 132 which are attached to the respective sides of the lift stages 125, projecting from both sides of the mast 128 in the travelling direction of the cart 123, with the mast 128 located therebetween in the travelling direction.

Hence it is possible to carry two packages 200 at once, and further to transfer the package 200 in a wider range than a movable area of the mast 128.

This leads to a better balance to the mast 128, and hence at the time of moving the mast 128, it is possible to reduce swinging of the mast 128 with respect to a moving direction.

Further, in the case of the present preferred embodiment, since the configuration in which the first transfer device 131 and the second transfer device 132 are arranged on both sides of one mast 128 in the travelling direction, the cart 123 is preferably long in the travelling direction. Hence it is possible to engage the horizontal guide member 121 and the guide member 127 at a position as distant from each other as possible in a symmetrical state to the mast 128, and allow stable traveling of the vertical guide member 124 without swinging. Meanwhile, when the cart 123 is excessively long, the movable area of the mast 128 is made narrow.

From the above, the length of the cart 123 is preferably equivalent to or shorter than a length from one edge to the other edge of the structural member, including the lift stage 125, the first transfer device 131 and the second transfer device 132, in the travelling direction of the cart 123.

Figure 5:
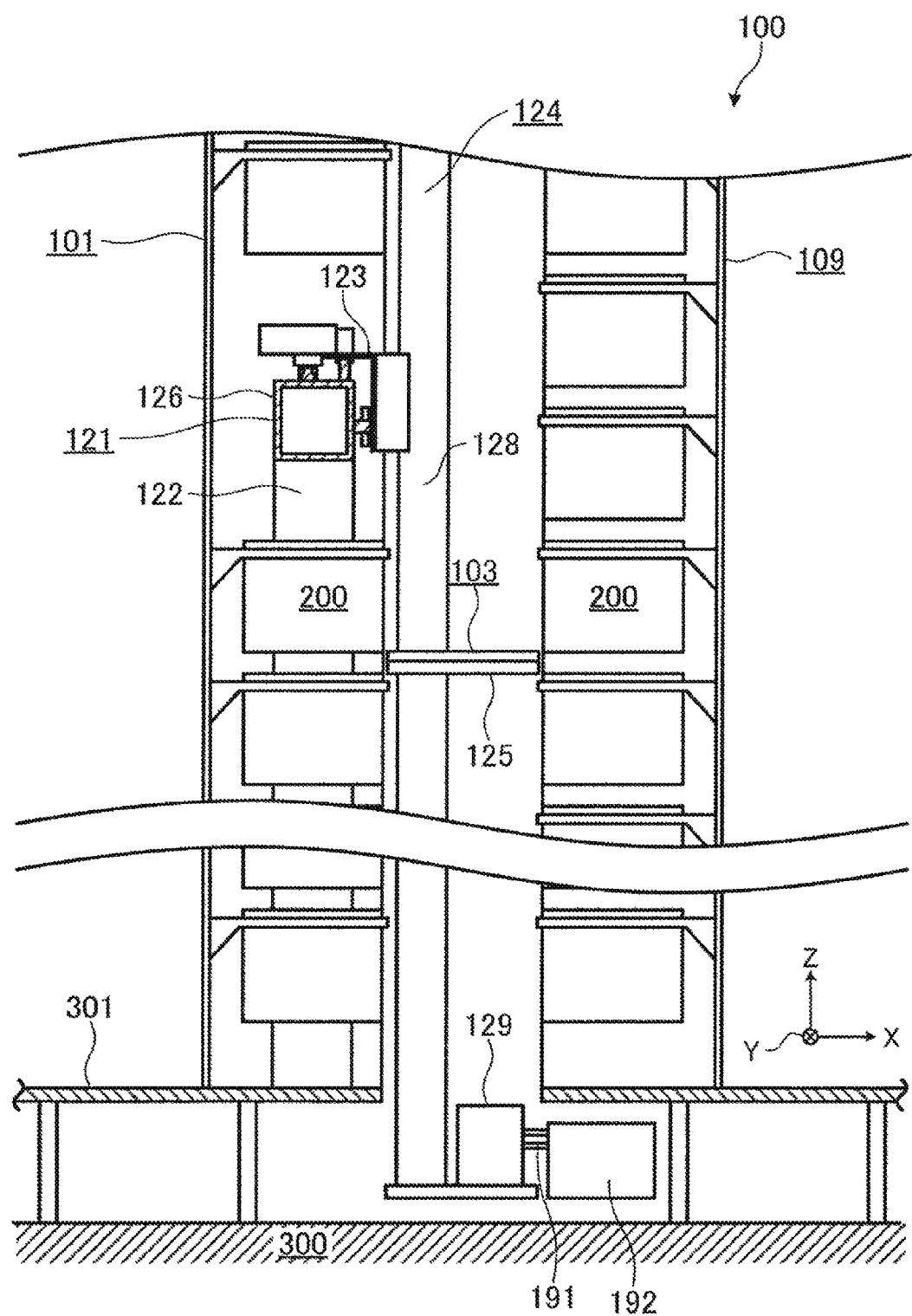
FIG. 5 is a side view illustrating, while partially omitting, an installed portion of the automatic warehouse.

FIG. 5 is a side view illustrating, while partially omitting, an installed portion of the automatic warehouse.

As illustrated in this drawing, the automatic warehouse 100 is provided with an opposite storage shelf 109 arranged facing the storage shelf 101. The opposite storage shelf 109 is a shelf to which the package 200 is transferred by the transfer device 103 provided in the carriage device 102 similarly to the storage shelf 101, and since the horizontal guide member 121 and the prop 122 are not provided, the opposite storage shelf 109 is able to store more packages 200 than the storage shelf 101.

The carriage device 102 is provided with a power cable 191 that supplies electric power to the carriage device 102 while changing its form below the opposite storage shelf 109 with travelling of the cart 123.

In the case of the present preferred embodiment, the automatic warehouse 100 preferably is installed on an attachment base 301 provided at a position separated by a predetermined height from a base part 300 of a building or the like. Meanwhile, the mast 128 of the automatic warehouse 100 extends to a position below the attachment base 301. The vertical driving device 129 that lifts and lowers the lift stage 125 is arranged below the carriage device 102 at a lower position than the attachment base 301. Further, since the power cable 191 arranged below the opposite storage shelf 109 at a lower position than the attachment base 301 changes its form with movement of the mast 128, the power cable 191 is in the state of being held by a cable protection chain 192 so as to reduce damage on the power cable 191 with the change in its form.

According to the automatic warehouse 100, by using the area corresponding to a plurality of levels (two levels in the present preferred embodiment) of the storage portion 111 in the storage shelf 101 as the area arranged with the horizontal guide member 121, the mast 128 is able to be located closer to the storage shelf 101 side. Thus, a person can pass over the mast 128 even between the storage shelf 101 and the opposite storage shelf 109. Hence it is possible to facilitate maintenance of the automatic warehouse 100.

Moreover, since the cart 123 which travels along the horizontal guide member 121 holds the mast 128 at its center or in the vicinity of the center, the structural strength of the mast 128 just has to be ensured to be equal to the strength for a length from the holding portion to the end of the mast 128. That is, the structural strength is able to be weaker than it would be when the mast 128 is held at the end. Hence the mast 128 is able to be made relatively fine or thin, and a percentage of the mast 128 in the space between the storage shelf 101 and the opposite storage shelf 109 is able to be made small. Also in this respect, it is possible to facilitate the person to pass over the mast 128 at the time of maintenance.

It is to be noted that the present invention is not restricted to the above preferred embodiment. For example, another preferred embodiment, realized by arbitrarily combining the constituent elements or features described in the present specification or excluding some of the constituent elements or features, may be taken as a preferred embodiment of the present invention. Further, the present invention includes a modified example obtained by making a variety of modifications conceived by a person skilled in the field on the above preferred embodiments in a range not deviating from the gist of the present invention.

Figure 6:
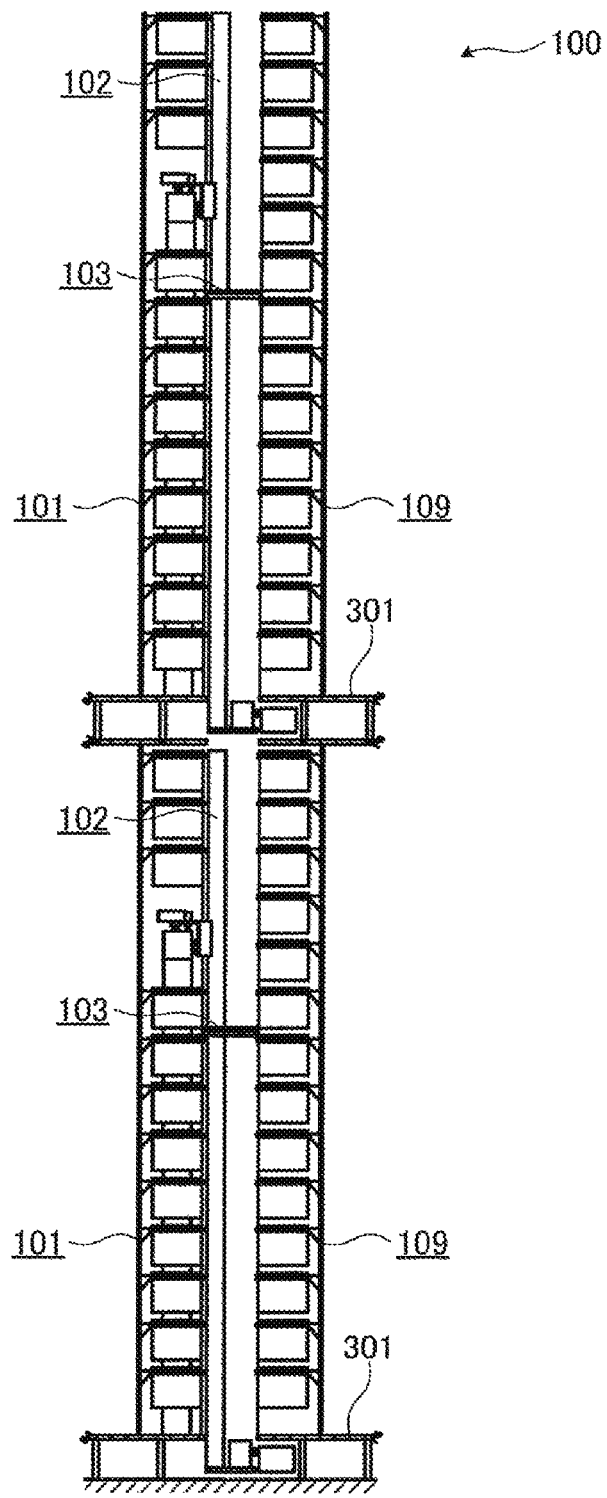
FIG. 6 is a side view illustrating an automatic warehouse formed by stacking carriage devices in a vertical direction.

For example, as illustrated in FIG. 6, the automatic warehouse 100 may be provided with a plurality of levels of the carriage devices 102 in the vertical direction. This enables simultaneous carriage of more packages 200 by the plurality of carriage devices 102, to achieve high processing ability. In this case, the storage shelf 101 and the opposite storage shelf 109 may be one big shelf.

Further, the horizontal guide member 121 may not only be supported while placed on the upper end surface of the prop 122, but may be fixed to the side surface of the prop 122 by clamping, welding or the like.

Moreover, the guide member 127 may have an equivalent length to a length of the cart 123 in the travelling direction of the cart 123. In this case, the cart 123 is provided with one guide member 127, and this can create the state of being slidably engaged to the horizontal guide member 121, on both sides of the mast 128 in the travelling direction.

Preferred embodiments of the present invention can be utilized for a warehouse that automatically performs storage, management, carrying-in/out, and the like, of a large number of packages.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An automated warehouse comprising:
   a storage shelf that includes storage portions including a first storage portion and a second storage portion, the storage portions storing a package and arrayed in a vertical direction and a lateral direction;

a carriage device that carries the package along the storage shelf, the carriage device including:

a horizontal guide that is arranged on an inside of the storage shelf and extends in the lateral direction along the storage shelf, the horizontal guide including a top surface and a bottom surface opposite to the top surface;

a prop that extends in the vertical direction along the storage shelf, with the storage portions existing on sides thereof in the lateral direction along the storage shelf, and supports the horizontal guide;

a cart that travels along the horizontal guide;

a vertical guide that extends in the vertical direction along the storage shelf and is fixedly connected to the cart at an intermediate position of the vertical guide such that the vertical guide travels along the horizontal guide with the cart; and a lift stage that is guided by the vertical guide to move in the vertical direction; and a transfer device that is attached to the lift stage and transfers the package between the storage shelf and the lift stage; wherein the first storage portion is located above the top surface of the horizontal guide;

the second storage portion is located below the bottom surface of the horizontal guide and below the first storage portion; and the horizontal guide is located between the first storage portion and the second storage portion in the vertical direction.

2. The automated warehouse according to claim 1, wherein the vertical guide includes a mast extending in the vertical direction;

the cart includes guides that are slidably engaged to the horizontal guide on both sides of the mast in a travelling direction; and the transfer device includes a first transfer device and a second transfer device respectively provided on both sides of the mast in the travelling direction.

3. The automated warehouse according to claim 2, wherein the horizontal guide includes:

a beam stretched between a plurality of props including the prop that extends in the vertical direction along the storage shelf;

a first rail attached to a first surface portion of the beam; and a second rail attached to a second surface portion of the beam which is different from the first surface portion of the beam; and the guides included in the cart are engaged to the first rail and the second rail.

4. The automated warehouse according to claim 1, wherein the cart includes a horizontal driving device which moves between the storage portions arranged in the vertical direction and allows traveling of the cart along the horizontal guide by a motor including a rotary axis body arranged along the horizontal guide.

5. The automated warehouse according to claim 1, further comprising:

a mast included in the vertical guide, the mast extending in the vertical direction;

an opposite storage shelf facing the storage shelf and to which the package is transferred by the transfer device; and a power cable that supplies electric power to the carriage device, the power cable being arranged below the opposite storage shelf and to move with a movement of the mast.

6. The automated warehouse according to claim 1, further comprising a plurality of carriage devices in the vertical direction.

* * * * *